United States Patent
Kawabe

(10) Patent No.: US 11,471,843 B2
(45) Date of Patent: Oct. 18, 2022

(54) STIRRING BAR AND STIRRING METHOD

(71) Applicant: SEKISUI MEDICAL CO., LTD., Tokyo (JP)

(72) Inventor: Toshiki Kawabe, Tokyo (JP)

(73) Assignee: SEKISUI MEDICAL CO., LTD., Tokyo (JP)

( * ) Notice: Subject to any disclaimer, the term of this patent is extended or adjusted under 35 U.S.C. 154(b) by 237 days.

(21) Appl. No.: 16/911,392

(22) Filed: Jun. 25, 2020

(65) Prior Publication Data
US 2020/0324259 A1      Oct. 15, 2020

Related U.S. Application Data

(63) Continuation of application No. PCT/JP2018/044867, filed on Dec. 6, 2018.

(30) Foreign Application Priority Data

Dec. 26, 2017 (JP) .............. JP2017-249188

(51) Int. Cl.
| | |
|---|---|
| *G01J 3/04* | (2006.01) |
| *B01F 33/452* | (2022.01) |
| *G01N 35/10* | (2006.01) |
| *G01N 1/28* | (2006.01) |
| *B01F 101/23* | (2022.01) |

(52) U.S. Cl.
CPC ........... *B01F 33/452* (2022.01); *G01N 35/10* (2013.01); *B01F 2101/23* (2022.01); *G01N 1/286* (2013.01)

(58) Field of Classification Search
CPC ... B01F 33/452; B01F 2101/23; G01N 35/10; G01N 1/286; G01N 35/02
USPC ........................................... 356/310
See application file for complete search history.

(56) References Cited

U.S. PATENT DOCUMENTS

| | | |
|---|---|---|
| 5,911,503 A | 6/1999 | Braden et al. |
| 2015/0117136 A1 | 4/2015 | Eble et al. |

(Continued)

FOREIGN PATENT DOCUMENTS

| | | |
|---|---|---|
| CN | 202516513 U | 11/2012 |
| CN | 104302385 A | 1/2015 |
| CN | 107076649 A | 8/2017 |

(Continued)

OTHER PUBLICATIONS

International Search Report in PCT Application No. PCT/JP2018/044867, dated Feb. 19, 2019, 3pp.

(Continued)

*Primary Examiner* — Md M Rahman
(74) *Attorney, Agent, or Firm* — Hauptman Ham, LLP

(57) ABSTRACT

A stirring bar capable of reducing a dead space inside a container and efficiently using a contained liquid. A stirring bar introduced into a reagent bottle having an opening mouth portion and rotated by a magnetic force transmitted from the outside of the reagent bottle so as to stir a reagent in the reagent bottle, including: a magnet having a predetermined shape; and a main body including a magnetic member therein, in which the main body is provided with a through-hole which has an opening area corresponding to an opened area and is able to receive a nozzle in the opening area, and in which the stirring bar in a rotation state is able to receive the nozzle in a circular center area narrower than the opening area and having a diameter of an opening width of a center portion of the opening area.

10 Claims, 6 Drawing Sheets

(56) References Cited

U.S. PATENT DOCUMENTS

2018/0043354 A1    2/2018  Yuki et al.
2018/0140128 A1    5/2018  Kodama et al.

FOREIGN PATENT DOCUMENTS

| CN | 107456912 A | 12/2017 |
|---|---|---|
| DE | 2017472 A1 | 11/1971 |
| JP | H8257387 A | 10/1996 |
| JP | H1033967 A | 2/1998 |
| JP | 200211342 A | 1/2002 |
| JP | 2005169303 A | 6/2005 |
| JP | 2005262013 A | 9/2005 |
| JP | 2009183831 A | 8/2009 |
| WO | 2016186063 A1 | 11/2016 |

OTHER PUBLICATIONS

Extended European Search Report in EP Application No. 18893357.6, dated Aug. 4, 2021, 9pp.
Office Action in CN Application No. 201880083086.5 dated Oct. 9, 2021, 14pp.
Office Action in JP Application No. 2019-562918, dated May 26, 2022, 8pp.
Office Action in CN Application No. 201880083086.5 dated Jun. 29, 2022, 9pp.
Office Action in EP Application No. 18893357.6 dated Jul. 4, 2022, 5pp.

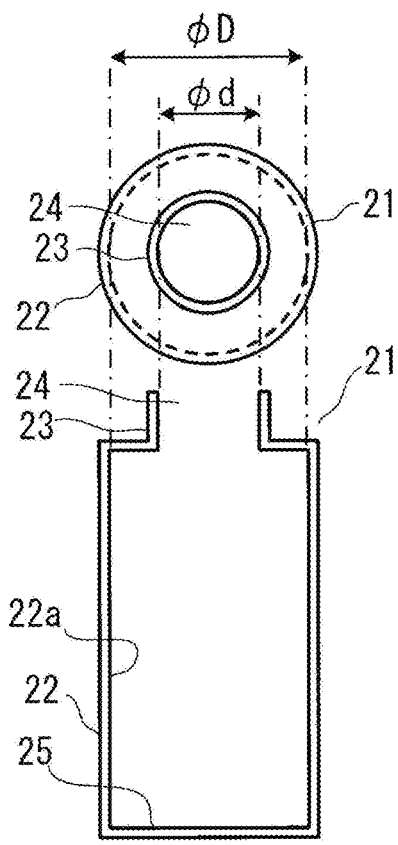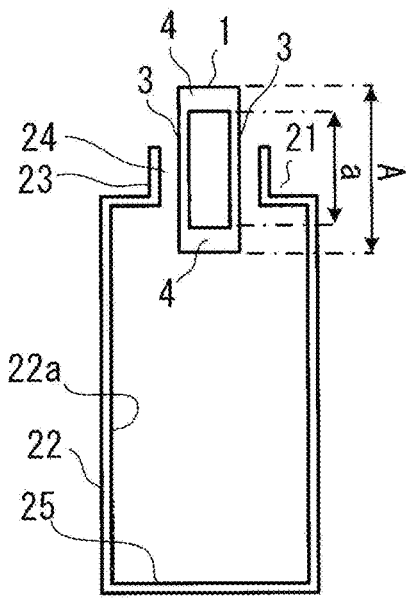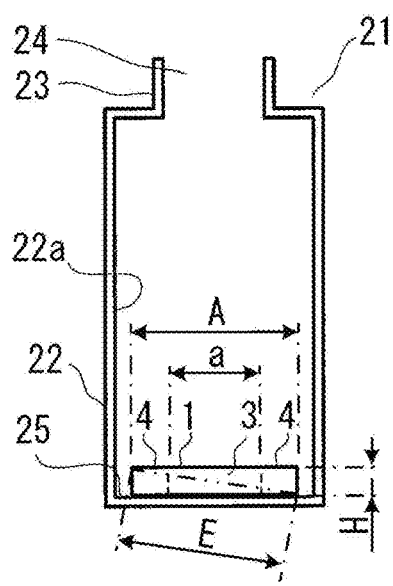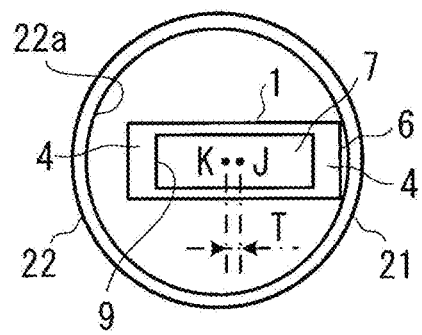
FIG. 3A
FIG. 3B
FIG. 3C
FIG. 3D

STIRRING BAR AND STIRRING METHOD

RELATED APPLICATIONS

The present application is a continuation of International Application Number PCT/JP2018/044867, filed Dec. 6, 2018, which claims priority from Japanese Application Number 2017-249188, filed Dec. 26, 2017 the disclosures of which applications are hereby incorporated by reference herein in their entirety.

TECHNICAL FIELD

The present invention relates to a stirring bar which rotates inside a container and stirs a contained liquid such as a liquid and a stirring method using the stirring bar.

BACKGROUND ART

Conventionally, a stirring method disclosed in Patent Document 1 below is known. In the stirring method of Patent Document 1, as described in Paragraphs 0009 and 0014, FIGS. 1A to 1C and 4A to 4C, and the like, a magnet rotation body (3) is disposed in an area just below the outside of a container (2) set in a container holder (11) and a stepping motor (12) is driven so that the magnet rotation body (3) rotates. A stainless stirring bar (4) is introduced into the container (2) and the magnet rotation body (3) is provided with a magnet (32).

Then, when a magnetic force of the magnet (32) is (magnetically) transmitted to the stirring bar (4) so that the magnet rotation body (3) rotates, the stirring bar (4) rotates horizontally and stirs a liquid inside the container (2). After the liquid is stirred by such a stirring method, a dispensing needle (5) is lowered into the container (2) and is stopped at a predetermined height so as to suck a predetermined amount of the liquid inside the container (2).

CITATION LIST

PATENT DOCUMENT

Patent Document 1: JP 2005-169303 A

SUMMARY OF THE INVENTION

Problem to be Solved by the Invention

Incidentally, when the above-described needle (5) can be lowered to the maximum and the suction can be performed while the tip of the needle (5) reaches a position just before a bottom surface of the container (2), most of the liquid can be used up without remain. In the stirring method described in Patent Document 1 above, the bottom surface of the container (2) is provided with a convex portion (21) so that the stirring bar (4) in a rotation stop state is displaced. Then, the stirring bar (4) is separated from a vertical line of the needle (5) so that the tip of the needle (5) can approach the bottom surface of the container (2).

However, in the stirring method of Patent Document 1, the dedicated container (2) having the convex portion (21) provided in the bottom surface is required and the lowering of the needle (5) is also restricted by the convex portion (21). That is, when the needle (5) is lowered to a height lower than the convex portion (21), the needle comes into contact with the convex portion (21). For this reason, since a dead space which is a space incapable of sucking a liquid is formed at least as much as the height of the convex portion (21), the liquid remains in the dead space.

The invention has been made to solve such problems and an object thereof is to provide a stirring bar and a stirring method capable of reducing a dead space inside a container and efficiently using a contained liquid in the container.

Means for Solving Problem

In order to achieve the above-described object, the invention provides a stirring bar which is introduced into a container having an opening mouth portion and is rotated by a magnetic force transmitted from the outside of the container so as to stir a contained liquid in the container, including: a magnetic member which has a predetermined shape; and a main body that incorporates the magnetic member therein, in which the main body is provided with a recess portion which has an opening area corresponding to an opened area and is able to receive a nozzle lowered into the container in the opening area, and in which the stirring bar which is in a rotation state is able to receive the nozzle in a circular center area narrower than the opening area and having a diameter of an opening width of a center portion of the opening area. Here, the "recess portion" is a concept including not only a shape with a closed bottom, but also a shape with a bottom opened and penetrating the main body.

Further, in order to achieve the above-described object, another invention provides the stirring bar such that the main body has a longitudinal direction directed to a falling direction when introducing the stirring bar into the container and a width direction extending in a direction intersecting the longitudinal direction, a length in the width direction is shorter than the opening width, and a length in the longitudinal direction is longer than the opening width.

Further, in order to achieve the above-described object, another invention provides the stirring bar such that the recess portion penetrates the main body.

Further, in order to achieve the above-described object, another invention provides a stirring method of introducing a stirring bar incorporating a magnetic member therein into a container having an opening mouth portion and rotating the stirring bar by a magnetic force transmitted from the outside of the container so as to stir a contained liquid in the container, in which a main body incorporating the magnetic member in the stirring bar is provided with a recess portion which has an opening area corresponding to an opened area and is able to receive a nozzle lowered into the container in the opening area, and in which the stirring bar which is in a rotation state is able to receive the nozzle in a circular center area narrower than the opening area and having a diameter of an opening width of a center portion of the opening area.

Further, in order to achieve the above-described object, another invention provides the stirring method such that the recess portion penetrates the main body.

Effect of the Invention

According to this configuration, it is possible to provide a stirring bar and a stirring method capable of reducing a dead space inside a container and efficiently using a contained liquid in the container. Hereinafter, a reagent nozzle which sucks a reagent in a container (a reagent bottle) storing a liquid reagent will be described as an example.

BRIEF DESCRIPTION OF DRAWINGS

FIG. 3A is an explanatory diagram illustrating a dimension of a main part of the reagent bottle indicated by a symbol, FIG. 3B is an explanatory diagram illustrating a state in which the stirring bar is introduced into the reagent bottle, FIG. 3C is an explanatory diagram illustrating a state in which the stirring bar stops inside the reagent bottle, and FIG. 3D is an explanatory diagram illustrating a state of the stirring bar stopped while being displaced from a center in the inner bottom portion of the reagent bottle when viewed from above;

MODE(S) FOR CARRYING OUT THE INVENTION

Figure 1A:
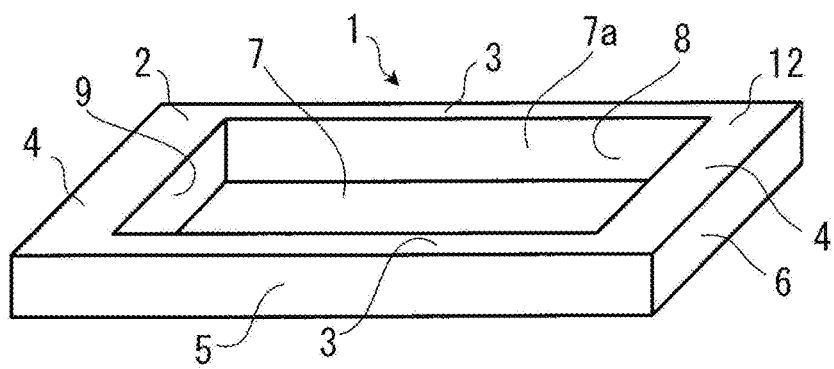
FIG. 1A is a perspective view of a stirring bar according to a first embodiment of the invention.
Figure 1B:
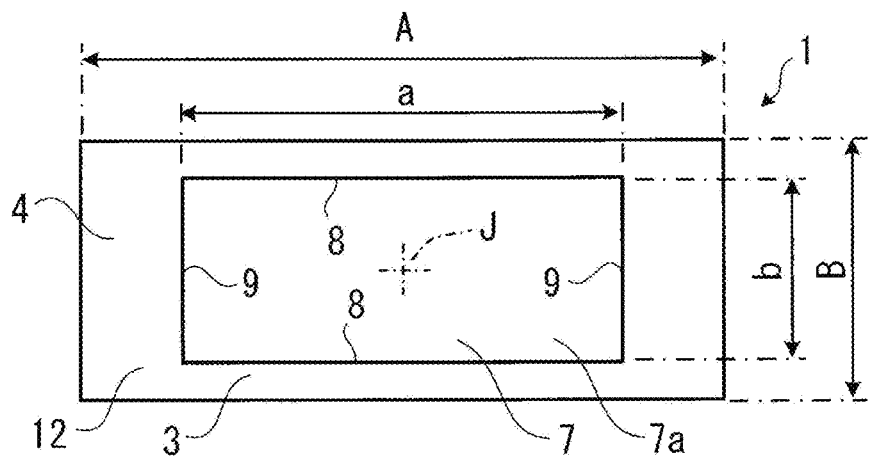
FIG. 1B is a plan view of the stirring bar.
Figure 1C:
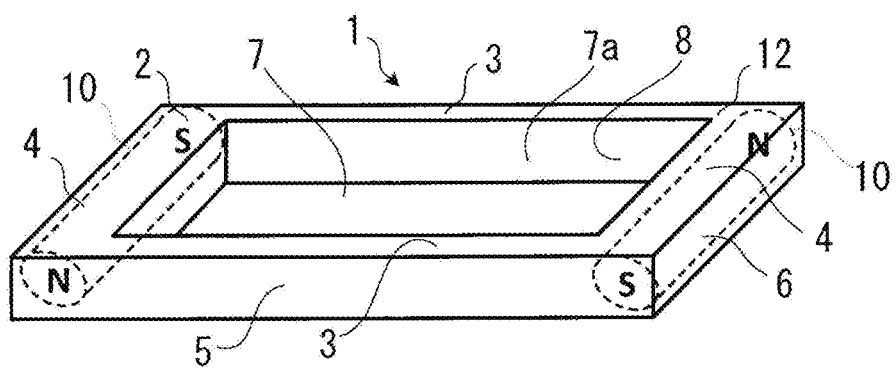
FIG. 1C is a perspective view in which a magnet inside the stirring bar is indicated by a dashed line.

Hereinafter, embodiments of a stirring bar of the invention will be described with reference to the drawings. FIGS. 1A to 1C illustrate a stirring bar 1 of a first embodiment of the invention. This stirring bar 1 includes a main body 2 obtained by molding a synthetic resin into a rectangular frame shape (a square shape of katakana) and Teflon (registered trademark) is used as a material of the main body 2.

The main body 2 is constituted by four sides and includes two long side portions 3 which are parallel to each other and two short side portions 4 which are also parallel to each other. The long side portion 3 and the short side portion 4 are formed in a quadrangular prismatic shape having a rectangular cross-section and the ends of the long side portion 3 and the short side portion 4 are integrally connected to each other at the adjacent sides. In the embodiment, the long side portion 3 and the short side portion 4 extend in a direction orthogonal to each other, but the invention is not limited thereto. For example, the long side portion 3 and the short side portion 4 may be formed so as to extend at an angle other than 90°. Further, the shape of the intersection portion between the long side portion 3 and the short side portion 4 may be, for example, a shape in which a corner is chamfered.

As illustrated in FIG. 1B, when a longitudinal length of an outer surface 5 of the long side portion 3 is indicated by A and a longitudinal length of an outer surface 6 of the short side portion 4 is indicated by B, a relationship of A>B is established therebetween. Hereinafter, the longitudinal length A of the outer surface 5 of the long side portion 3 is referred to as an "outer long side length A" or the like. Hereinafter, the longitudinal length B of the outer surface 6 of the short side portion 4 is referred to as an "outer short side length B" or the like.

A center portion of the main body 2 is provided with a through-hole 7 which penetrates the main body 2 in the thickness direction and is formed as a recess portion having an opening area 7a opening in a rectangular shape. This through-hole 7 is a rectangular parallelepiped space surrounded on all sides by an inner surface 8 of the long side portion 3 and an inner surface 9 of the short side portion 4. When the longitudinal length of the inner surface 8 of the long side portion 3 is indicated by a and the longitudinal length of the inner surface 9 of the short side portion 4 is indicated by b, a relationship of a>b is established therebetween.

Here, the (longitudinal) length a of the inner surface 8 of the long side portion 3 is a gap between the inner surfaces 9 of two short side portions 4 which are parallel to each other and can be an opening length of the through-hole 7. Further, the (longitudinal) length b of the inner surface 9 of the short side portion 4 is a gap between the inner surfaces 8 of two long side portions 3 which are parallel to each other and can be an opening width of the through-hole 7. Then, hereinafter, the length a is referred to as an "inner long side length a" or the like and the length b is referred to as an "inner short side length b" or the like in some cases.

The inside of each long side portion 3 is uniformly formed of a synthetic resin as a material. In contrast, a bar magnet (hereinafter, referred to as a "magnet") 10 which is a magnetic member is incorporated in each short side portion 4 as transparently illustrated in FIG. 1C. Then, the inside of the short side portion 4 is formed by a synthetic resin which is a material of an outer portion and the magnet 10 having a specific gravity larger than that of the synthetic resin. The magnet 10 has one axial end as an N pole and the other axial end as an S pole as indicated by a symbol in the drawings and the axial direction matches the longitudinal direction of the short side portion 4. Further, the directions of two magnets 10 are determined so that the polarities are opposite to each other.

Figure 2A:
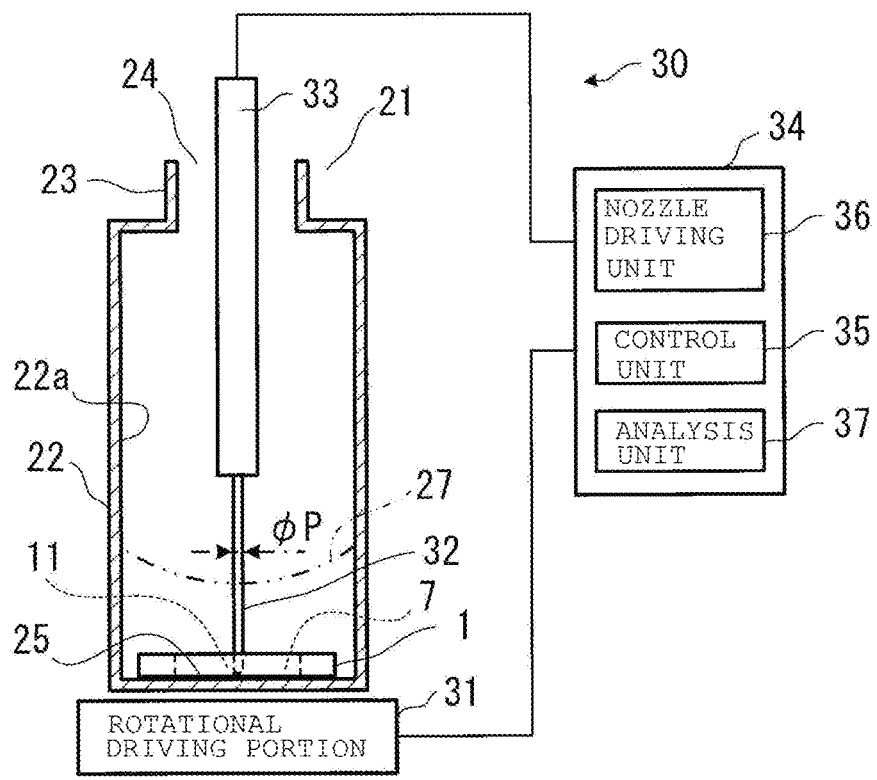
FIG. 2A is an explanatory diagram schematically illustrating a state in which a reagent nozzle is lowered into a reagent bottle having the stirring bar introduced thereinto.

The stirring bar 1 with such a structure is introduced into a reagent bottle 21 which is a container illustrated in FIG. 2A by, for example, a person using the stirring bar. In the embodiment, the reagent bottle 21 is formed of glass and is colorless and transparent (or may be colored and transparent). The reagent bottle 21 is formed in a stepped cylindrical shape including a body portion 22 having a relatively large diameter and a neck portion 23 having a diameter smaller than the body portion 22. Further, the reagent bottle 21 is attached (set) to a reagent tray (not illustrated) in, for example, an automatic analysis device (hereinafter, referred to as "analysis device") such as a blood coagulation analysis device in a standing posture while a lid (not illustrated) is removed and a mouth portion 24 faces upward.

FIG. 2A schematically illustrates a state in which the reagent bottle 21 is set to an analysis device 30. In the analysis device, an operation is performed so that a rotational driving portion 31 is located at a position immediately below the reagent tray to which the reagent bottle 21 is set. Although not illustrated in the drawings, the rotational driving portion 31 includes a magnetic force transmitting magnet which applies a magnetic force to the stirring bar 1 in the reagent bottle 21 or a rotation mechanism which rotates the magnetic force transmitting magnet. Then, when the rotational driving portion 31 is operated to rotate the magnetic force transmitting magnet (not illustrated), the stirring bar 1 in the reagent bottle 21 rotates in a synchronization state by the non-contact transmission of the magnetic force.

The analysis device is provided with a dispensing reagent nozzle (hereinafter, referred to as a "nozzle") 32. This nozzle 32 is formed in a cylindrical shape and a diameter P of, for example, about 1 mm. Further, although not illustrated in the drawings, the nozzle 32 is supported by a movement mechanism enabling the movement in the horizontal direction or the height direction and is connected to a suction and ejection mechanism enabling the suction and the ejection of the reagent as a contained liquid. Here, the analysis device of the embodiment is provided with a heater incorporated reagent heating flow path and one indicated by reference numeral 33 in FIG. 2A is a reagent heating heater provided in the movement mechanism. Then, the driving of the movement mechanism or the suction and ejection mechanism is performed by a nozzle driving unit 36 under the control of a control unit 35 provided in an operation unit 34 of the analysis device 30.

The nozzle 32 having the above-described configuration enters the reagent bottle 21, stops at a predetermined height, and sucks a predetermined amount of the reagent so as to perform sampling. Further, although not illustrated in the drawings, the nozzle 32 rises to a state in which the tip (the lower end) comes out of the reagent bottle 21 and moves horizontally in this raised state. Then, the nozzle 32 is lowered after reaching, for example, the upper side of a target reaction container or the like from which a sample has been discharged and discharges a reagent into the reaction container or the like. Further, an analysis for a predetermined examination is automatically performed by an analysis unit 37 of the analysis device 30.

Here, as the movement mechanism, the suction and ejection mechanism, the rotational driving portion 31, the nozzle 32, a holder 33, and the like provided in the analysis device, various general types can be adopted. Further, the nozzle 32 may be, for example, one in which a plurality of (two or more) nozzle bodies are mounted in parallel to each other.

When the stirring bar 1 is introduced into the reagent bottle 21, for example, the stirring bar naturally falls and sinks in the liquid reagent and stops when reaching an inner bottom portion 25 of the reagent bottle 21. As described above, the shape of the stirring bar 1 is a rectangular frame shape and the magnet 10 is incorporated in each of two short side portions 4 separated from each other. For this reason, the stirring bar 1 stops in a horizontal posture in which two long side portions 3 (and two short side portions 4) face each other.

Figures 2B, 2C:
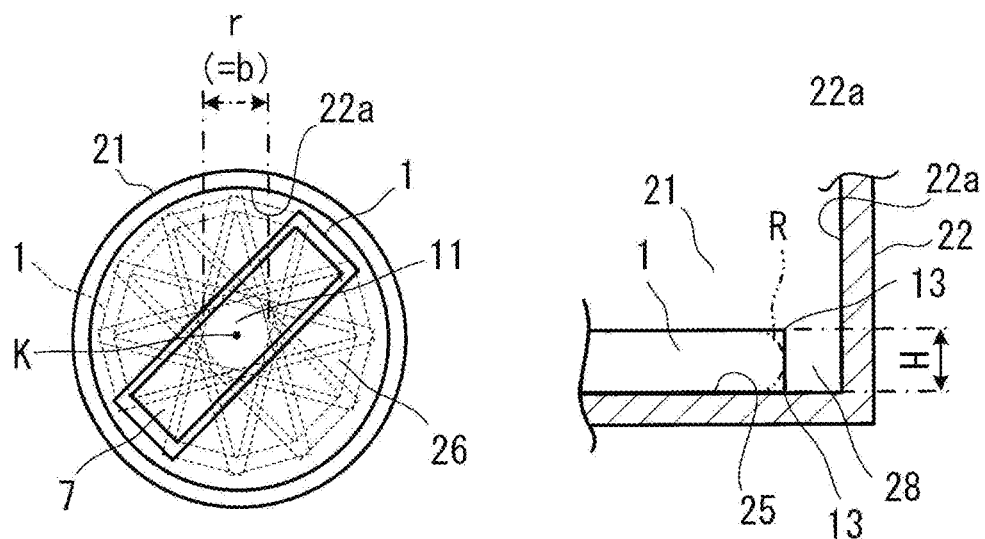
FIG. 2B is an explanatory diagram schematically illustrating a state of the stirring bar rotating inside the reagent bottle when viewed from above.
FIG. 2C is an enlarged explanatory diagram illustrating a state of a part of the stirring bar in an inner bottom portion of the reagent bottle when viewed from the side.

When the rotational driving portion 31 of the analysis device is driven in this state, the stirring bar 1 rotates in a horizontal plane in the lying posture and stirs the reagent in the reagent bottle 21. FIG. 2B is a diagram schematically illustrating a state of the stirring bar 1 rotating in the inner bottom portion 25 of the reagent bottle 21 when viewed from above. Then, in the drawing, the stirring bar 1 is indicated by a dashed line at the intermittent timing of the rotation angle every 30° and the dashed lines are combined.

In many cases, the stirring bar 1 is displaced (biased) from a center K of the inner bottom portion 25 of the reagent bottle 21 before the rotation of the stirring bar 1. FIG. 3D to be described later illustrates an example of the displaced state. Then, a symbol T in FIG. 3D indicates a deviation amount of the center K of the inner bottom portion 25 of the reagent bottle 21 and a center J of the through-hole 7 of the stirring bar 1.

When the stirring bar 1 starts to rotate from a state before rotation illustrated with reference to FIG. 3D, the stirring bar 1 rotates at the center portion of the inner bottom portion 25 of the reagent bottle 21 as illustrated in FIG. 2B due to the centering effect with the rotation. As described above, the stirring bar 1 is provided with the through-hole 7. For this reason, the center K of the inner bottom portion 25 is always visible through a true circular area (hereinafter, referred to as a "center area of the through-hole 7") 11 reaching a predetermined range from the center J of the through-hole 7 during the rotation of the stirring bar 1. Then, the size when the center area 11 is viewed from above is narrowed to be smaller than the size when the entire through-hole 7 is viewed from above, for example, when the stirring bar 1 is stopped.

For this reason, even when the nozzle 32 of the analysis device is lowered into the reagent bottle 21 toward the center of the inner bottom portion 25 as illustrated in FIG. 2A during the rotation of the stirring bar 1, the tip of the nozzle 32 passes through a height level of an upper surface 12 of the stirring bar 1 and enters the center area 11 of the through-hole 7. Then, the nozzle 32 can be lowered further so that the tip of the nozzle 32 can approach the inner bottom portion 25 of the reagent bottle 21 as close as possible. In this way, since the stirring bar 1 is provided with the through-hole 7 which produces the center area 11 during the rotation, the nozzle 32 can be lowered to the inner bottom portion 25 of the reagent bottle 21 as close as possible.

In contrast, as illustrated in FIG. 2B, there is a timing at which the short side portion 4 or the long side portion 3 passes in an area (hereinafter, referred to as an "outer peripheral area of the inner bottom portion 25") 26 on the outside of the center area 11 in the through-hole 7 with the rotational displacement of the stirring bar 1. For this reason, when the nozzle 32 is lowered toward the outer peripheral area 26 of the inner bottom portion 25 so that the nozzle 32 reaches a height level of the upper surface 12 of the stirring bar 1 during the rotation of the stirring bar 1, the lower end of the nozzle 32 contacts and interferes with the stirring bar 1. Thus, the nozzle 32 can be allowed to enter the through-hole 7 without contacting the stirring bar 1 as described above in such a manner that the nozzle 32 is lowered to a position entering the center area 11 when sucking the reagent during the rotation of the stirring bar 1.

Further, when the lowering position of the nozzle 32 is within the range of the center area 11 in the through-hole 7 even when the lowering position is displaced from the center K of the inner bottom portion 25, the nozzle 32 can be allowed to enter the through-hole 7 of the stirring bar 1 in the rotation state. Here, one indicated by a reference numeral 27 and a two-dotted chain line in FIG. 2A is a liquid surface of the reagent which is lowered at the center portion and is raised at the outer peripheral portion due to the centrifugal force during stirring.

Meanwhile, the stirring bar 1 is stopped at the center of the inner bottom portion 25 of the reagent bottle 21 and the inner bottom portion 25 is exposed from the entire through-hole 7 after the rotation of the stirring bar 1 is stopped. For this reason, when stopping the rotation, the center K of the inner bottom portion 25 of the reagent bottle 21 is visible from the through-hole 7. Then, the tip of the nozzle 32 can be allowed to enter the through-hole 7 in such a manner that the nozzle 32 is lowered toward the center K of the inner bottom portion 25. In this way, it is also possible to sample the reagent by lowering the nozzle 32 after stopping the stirring.

In such a stop state of the stirring bar 1, the position of the stirring bar 1 can be maintained to a certain degree by the magnetic force transmitting magnet (not illustrated) of the analysis device. However, in some cases, a case in which the center J of the stirring bar 1 does not match the position of the center K of the inner bottom portion 25 can be assumed (an example is illustrated in FIG. 3D). Even in such a case, when the center K of the inner bottom portion 25 is within the through-hole 7, the nozzle 32 can be allowed to approach the inner bottom portion 25 by lowering the nozzle 32 toward the center K of the inner bottom portion 25.

In the stirring bar 1 that exhibits the above-described function, the following description is also possible. For example, the size of the center area 11 in the through-hole 7 of the stirring bar 1 can be expressed by the above-described length b. The above-described length b is a gap (opening width) between the inner surfaces 8 of two long side portions 3 which are parallel to each other. In the embodiment, since the opening shape of the through-hole 7 is a rectangular shape, the gap (opening width) between the inner surfaces 8 is constant not only at the center portion in the longitudinal direction but also the other portions. Then, in the rotation state of the stirring bar 1, the center area 11 becomes a true circular area when viewed from above and its diameter r matches the gap b of the inner surface 8 (the opening width of the through-hole 7) as illustrated in FIG. 2B.

FIGS. 3A to 3D schematically illustrate a dimensional relationship of main parts of the reagent bottle 21 and the stirring bar 1 or a state when introducing the stirring bar 1 into the reagent bottle 21. Additionally, in FIGS. 3A to 3D, hatching indicating a cross-section of the reagent bottle 21 is omitted to prevent the drawing from being complicated.

In FIG. 3A, a dimension of a main part of the reagent bottle 21 is indicated by a symbol D or a symbol d. The symbol D of them indicates a dimension of the inner diameter of the body portion 22 (hereinafter, referred to as a "body portion inner diameter") of the reagent bottle 21. Further, the symbol d indicates the inner diameter of the mouth portion 24 (hereinafter, referred to as a "mouth portion inner diameter"). Then, the magnitude relationship between the body portion inner diameter D and the mouth portion inner diameter d is D>d.

Here, in the embodiment, the body portion inner diameter D is assumed to match the diameter of the inner bottom portion 25 (hereinafter, referred to as an "inner bottom portion diameter"). Further, the mouth portion inner diameter d of the embodiment is the same as the inner diameter of the neck portion 23 (hereinafter, referred to as a "neck portion inner diameter"). However, the invention is not limited thereto and, for example, the body portion inner diameter and the inner bottom portion diameter may be slightly different from each other. Further, the mouth portion inner diameter d may be smaller than the neck portion inner diameter.

When introducing the stirring bar 1 into the reagent bottle 21, the stirring bar 1 is inserted into the mouth portion 24 in a direction in which two short side portions 4 are arranged in the vertical direction as illustrated in FIG. 3B. As described above, the stirring bar 1 naturally falls, but the stirring bar 1 is stopped at the inner bottom portion 25 while its posture is changed to a lying state inside the reagent bottle 21.

FIG. 3C illustrates a dimension of a main part of the stirring bar 1 having a horizontal posture and a symbol E of the drawing indicates a diagonal length (hereinafter, referred to as a "short side outer diagonal length") of the stirring bar 1 from the upper end (or the lower end) of the outer surface 6 of one short side portion 4 to the lower end (or the upper end) of the outer surface 6 of the other short side portion 4. Further, a symbol H of the drawing indicates a thickness of the stirring bar 1 and the thickness H is common to both the long side portion 3 and the short side portion 4. Further, the thickness H of the stirring bar 1 may be different between the long side portion 3 and the short side portion 4.

The dimensions of respective parts of the stirring bar 1, the reagent bottle 21, and the nozzle 32 described above can be summarized as below, a relationship such as (1) to (3) below is established between these sizes.

A: Outer long side length of stirring bar 1
a: Inner long side length of stirring bar 1
B: Outer short side length of stirring bar 1
b: Inner short side length of stirring bar 1
D: Body portion inner diameter D of reagent bottle 21
d: Mouth portion inner diameter of reagent bottle 21
E: Short side outer diagonal length of stirring bar 1
(1) B<d<A
(2) E<D
(3) b>P Among these relationships, the relationship (B<d<A) of (1) shows that the outer short side length B of the stirring bar 1 is smaller than the mouth portion inner diameter d of the reagent bottle 21 and the mouth portion inner diameter d is smaller than the outer long side length A of the stirring bar 1. Further, the relationship (E<D) of (2) shows that the short side outer diagonal length E of the stirring bar 1 is smaller than the body portion inner diameter D of the reagent bottle 21.

Further, the relationship (b>P) of (3) shows that the inner short side length b of the stirring bar 1 is larger than the occupied area (passing area) of the nozzle 32. Here, since the "occupied area (passing area) of the nozzle 32" can be expressed by a cross-sectional area calculated by the diameter P of the nozzle 32 and a so-called "play (positional variation)" in a horizontal plane, this area can be paraphrased as, for example, the "occupied length (passing length) of the nozzle 32".

The above-described stirring bar 1 has the following operation and effect. That is, a space is provided at the center portion of the stirring bar 1 due to the through-hole 7 and the space dimension is wider than the passing area of the nozzle 32. Then, the entrance area of the nozzle 32 can be secured by using the center portion of the through-hole 7 when the stirring bar 1 rotates or stops after rotation. For this reason, the lower end of the nozzle 32 can be allowed to reach a portion lower than the upper surface 12 of the stirring bar 1 through the through-hole 7 of the stirring bar 1 having a horizontal posture. Then, it is possible to suck the reagent by the nozzle 32 while the nozzle 32 approaches the inner bottom portion 25 of the reagent bottle 21 as close as possible.

As a result, it is possible to reduce the size of a dead space which is an area not touched by the nozzle 32 to a minimum. Further, most of the reagent in the reagent bottle 21 can be used up together with the reagent outside the stirring bar 1 and thus the reagent can be used without waste. Then, since the amount of the reagent inside the reagent bottle 21 can be reduced in advance or the frequency of replacement of the reagent bottle 21 can be lowered compared to the related art having relatively many dead spaces, it is possible to reduce the cost of the reagent.

Conventionally, there is a case in which the reagent bottle 21 is replaced without using about 1.7 mL of the reagent stored to, for example, 10 mL in the reagent bottle 21 before opening. However, since the stirring bar 1 of the embodiment is used, the remaining amount of the reagent can be reduced to about 1 mL during replacement. Then, since the amount of the discarded reagent can be reduced, there is a contribution to not only cost reduction but also environmental protection.

Further, according to the stirring bar 1 of the embodiment, the nozzle 32 can enter the through-hole 7 in any case of the rotation state and the stop state of the stirring bar 1 in such a manner that the nozzle 32 is lowered toward the center K of the inner bottom portion 25 in the reagent bottle 21. Then, the dead volume of the reagent bottle 21 can be reduced while using the conventional one as the reagent bottle 21 or the analysis device 30.

Further, the stirring bar 1 of the embodiment is formed in a rectangular shape on the whole and the length (the outer short side length B) of the short side portion 4 is shorter than the length (the outer long side length A) of the long side portion 3. For this reason, a person who uses the stirring bar 1 can narrow the width by pinching the stirring bar 1 so that the longitudinal direction of the long side portion 3 faces the vertical direction. For this reason, even when the stirring bar 1 is enlarged so that the length (the outer long side length A) of the long side portion 3 is longer than the inner diameter (the mouth portion inner diameter d) of the mouth portion 24 of the reagent bottle 21, the stirring bar 1 can introduced into the reagent bottle 21. Further, since the length (the outer long side length A) of the long side portion 3 is long, the stirring bar 1 can occupy a wider area in the bottom portion of the reagent bottle 21 and hence the stirring efficiency during rotation can be improved. Further, since the through-hole 7 penetrating the main body 2 is provided, it is highly convenient in that the stirring bar can be used without distinguishing the front and back surfaces when introducing the stirring bar into the reagent bottle 21.

Further, since the shape of each long side portion 3 or each short side portion 4 is a quadrangular prismatic shape, the presence of the corners 13 can ensure a large contact area with the reagent compared to a case in which each of the side portions 3 and 4 has a columnar shape (a cross-sectional shape is a circle) and the outer dimensions are almost the same as those of the stirring bar of the embodiment, for example, as virtually indicated by a curve of a two-dotted chain R of FIG. 2C. For this reason, since it is easy to give a motion to the reagent during the rotation of the stirring bar 1, it is possible to efficiently perform stirring in a short time.

Further, as illustrated in FIG. 2C, in the inner bottom portion 25 of the reagent bottle 21, the corner 13 of the short side portion 4 (which is also the corner of the end of the long side portion 3) can enter (be close to) a corner 28 of the reagent bottle 21. For this reason, since the stirring bar 1 can be brought into contact with the reagent even at the corner 28 of the reagent bottle 21 and the reagent can be easily moved also at the corner 28, stagnation (retention) does not easily occur at the corner 28.

Further, according to the stirring bar 1 of the embodiment, since Teflon (registered trademark) having excellent chemical resistance and self-lubricating property is used as the base material of the main body 2, it is possible to prevent the stirring bar 1 from influencing the properties of the reagent. As long as similar characteristics can be obtained, a material other than Teflon (registered trademark) can be used as the base material of the main body 2. It is conceivable that, for example, as a material other than Teflon (registered trademark), PEEK (polyetheretherketone) or the like is used.

Further, in general, the reagent can be used in various forms. For example, the reagent contained in one reagent bottle 21 may be used up in one day or several days or may be used for a long period of time such as two weeks or thirty days. Then, the amount of the reagent in the reagent bottle 21 is smaller than the amount of the reagent at the start of use at the end of the use period related to such one reagent bottle 21. For this reason, generally, at the end of the use period, sufficient stirring can be performed with a short rotation time. Then, according to the stirring bar 1 of the embodiment, even when the reagent gradually decreases and the liquid surface of the reagent becomes lower than the height of the stirring bar 1, the reagent can still be used continuously.

Regarding the necessity of stirring the reagent, even when the same item is inspected using the same reagent, there are cases in which the stirring is required or not required, for example, due to differences in companies and research institutions. Further, depending on the type and composition of the reagent, there are those in which the sedimentation of the compound does not easily occur and a uniform system is easily maintained and those in which the sedimentation easily occurs and a uniform system is hardly maintained (they easily become non-uniform). Furthermore, there is a case in which the reagent needs to be stirred constantly while using the reagent or a case in which the stirring is performed periodically and the stirring need not be performed at other times. Further, there is a case in which the stirring needs to be performed constantly even when the number of rotations is small and the stirring is weak. According to the stirring bar 1 of the embodiment, since the stirring can be performed efficiently, it is possible to meet various demands. Further, it is conceivable that, for example, a composition in which a mixture settles immediately even with stirring and cannot be used as a reagent in the past can be used as a reagent.

Further, it is preferable to optimize the characteristics of the stirring bar 1 such as a weight, a dimension of each part, an arrangement of the magnet 10, and a magnetic strength of the magnet 10 in consideration of the use environment such as the dimensions of reagent bottles to be used, the amount of reagents, viscosity, and non-uniformity of the composition or the specification of the magnet for transmitting magnetic force. For example, when the sedimentation amount of the reagent is large and strong stirring is required, it is conceivable that the weight of the stirring bar 1 is relatively increased. Then, according to the stirring bar 1 of the embodiment, since the stirring efficiency can be increased by a relatively simple structure, it is easy to change the design relating to the shape and dimensions of each part for optimization.

Further, in the embodiment, the shape of the long side portion 3 or the short side portion 4 is a quadrangular prismatic shape, but the invention is not limited thereto. For example, various shapes such as a triangular prism, a cylinder, and a polygonal prism can be adopted. Then, the cross-sectional shape of the long side portion 3 or the short side portion 4 in that case can be a regular triangle, an isosceles triangle, a circle, an ellipse, a polygon, or the like. Further, various shapes such as a triangular prism, a quadrangular prism, and a polygonal prism can be adopted as the shape of the magnet 10. Then, the cross-sectional shape may be a regular triangle, an isosceles triangle, a circle, an ellipse, a polygon, or the like.

The characteristics of stirring by the stirring bar 1 can be improved by the function of the analysis device. For example, when the sedimentation amount of the reagent is large and strong stirring is required for a long period of time, it is possible to control the analysis device so that the number of rotations of the rotational driving portion 31 is relatively large. Also for the stirring time, it is also conceivable that the stirring bar 1 is rotated for a relatively short time in the case of a reagent in which a mixture is relatively unlikely to settle and the stirring bar is rotated for a long time in the case of a reagent in which a mixture is relatively easily settled in accordance with the setting of the control condition of the analysis device.

Such control of the number of rotations in the analysis device is performed in advance as an initial setting (default) according to, for example, a difference in inspection item. Further, the rotation speed of the stirring bar 1 can be also changed by adjusting the number of rotations during stirring. The adjustment of the number of rotations can be also performed in accordance with the amount of liquid reagent remaining in the reagent bottle 21 (liquid level). As a method of detecting the liquid level, it is conceivable that a method of detecting a change in capacitance at the tip of the reagent nozzle when the reagent nozzle comes into contact with the liquid surface is adopted.

It is conceivable that the adjustment of the number of rotations is performed, for example, in consideration of the generation of bubbles. It can be said that bubbles are easily generated when the liquid amount of the reagent is small or when the viscosity of the reagent is high. Further, there is a case in which bubbles are generated even when the number of rotations of the stirring bar is too high for the characteristics of the reagent. Then, for example, when performing the liquid surface detection as described above, the upper surface of the bubble may be detected as the liquid surface and the bubble may influence the accuracy of the liquid surface detection. For this reason, it is possible to detect bubbles in the analysis device and use the detection results for highly accurate reagent management. As the bubble detection method, for example, a case can be exemplified in which a control unit (not illustrated) of the analysis device determines that bubbles are generated when the liquid level height rises on the basis of a history of a detection result by performing a liquid level detection together whenever sucking the reagent. Further, the number of rotations can be adjusted so as to prevent liquid surface fluctuation in which the liquid surface of the reagent fluctuates up and down during the stirring.

For the shape of the stirring bar 1, a case in which the stirring bar 1 used once is used again is assumed. For example, it is possible to avoid irregularities and shapes having sharp corners as much as possible so that the stirring bar 1 can be easily cleaned and to facilitate removal of deposits during cleaning. Further, since the size of the reagent bottle 21 is usually standardized to some extent, the stirring bar 1 as in this embodiment can be mass-produced.

Additionally, the configuration of the stirring bar according to the invention is not limited to the above-described embodiment and can be modified into various forms. Additionally, in the following description, the same reference numerals will be given to the same parts as those of the embodiment (hereinafter, referred to as a "first embodiment") illustrated in FIGS. 1A to 3D and description thereof will be omitted.

Figure 4A:
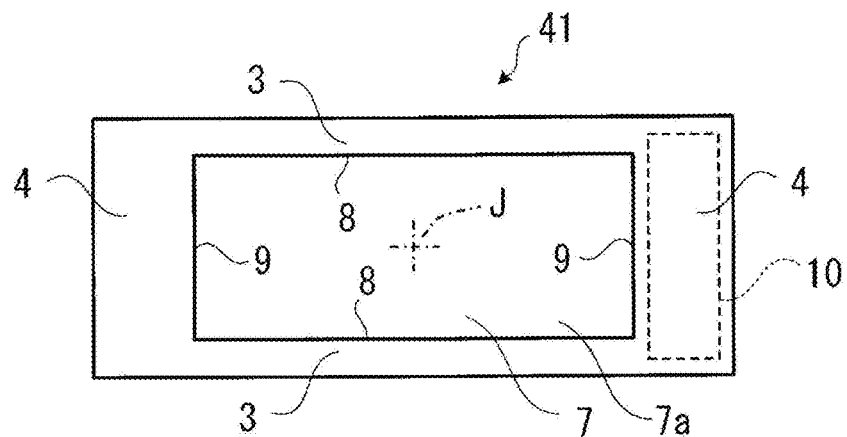
FIG. 4A is an explanatory diagram illustrating a modified example according to the stirring bar of the first embodiment.

For example, FIG. 4A illustrates a first modified example of the invention according to the first embodiment. As described above, in the stirring bar 1 according to the first embodiment, the magnet 10 is incorporated in each of two short side portions 4, but as in a stirring bar 41 of the first modified example, the magnet 10 may be provided only in any one of the short side portions 4. However, in this case, since a weight balance changes, a case in which the rotation is not easily stabilized during the rotation of the stirring bar 41 can be conceived. However, the rotation stability can be maintained by aligning the weight balance while enlarging the outer shape dimension of the short side portion 4 without incorporating the magnet 10 therein. Further, although not illustrated in the drawings, the magnet 10 can be incorporated in both or one of the long side portions 3 instead of the short side portion 4.

Figure 4B:
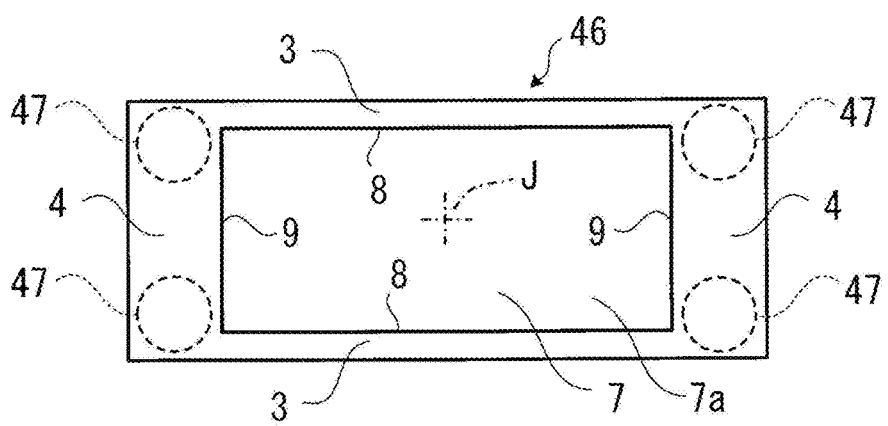
FIG. 4B is an explanatory diagram illustrating another modified example.

Further, as in a stirring bar 46 of a second modified example illustrated in FIG. 4B, a disk-shaped magnet 47 may be disposed in each of four corners of the main body 2. In the magnet 47, N and S poles are directed in the thickness direction of the main body 2 and the direction of polarities are determined so that the magnetic forces do not cancel each other. In this way, the entire weight balance can be easily adjusted.

Figure 4C:
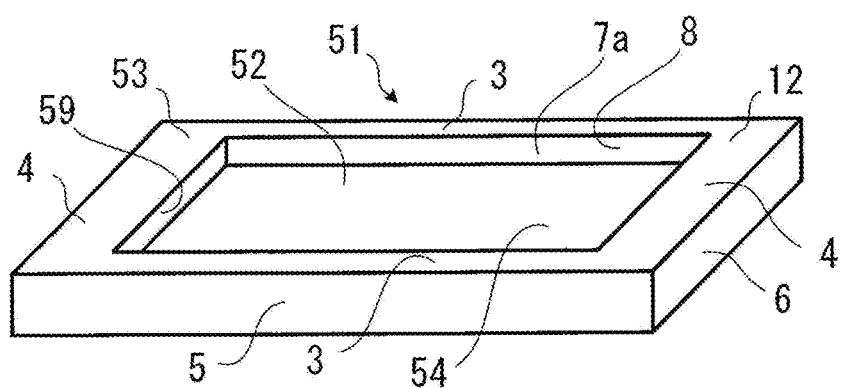
FIG. 4C is an explanatory diagram illustrating another modified example.

Further, a recess portion 52 may be formed as in a stirring bar 51 of a third modified example illustrated in FIG. 4C. That is, the stirring bar 1 according to the first embodiment includes the through-hole 7 penetrating in the thickness direction, but as in the stirring bar 51 illustrated in FIG. 4C, a main body 53 may be provided with a recess portion 52 which is not penetrated and is closed by a bottom portion 54. Also in this case, the tip of the nozzle 32 can be lowered to be lower than the height of the upper surface 12 in the stirring bar 51 and the reagent accumulated in the recess portion 52 can be used. In this way, the stirring bar 51 with the recess portion 52 which is not penetrated is easily manufactured compared to the stirring bar 1 with the through-hole 7. Further, the arrangement and size of the magnet (not illustrated) may be such that at least a part of the magnet reaches the bottom portion of the recess portion 52.

Figure 5A:
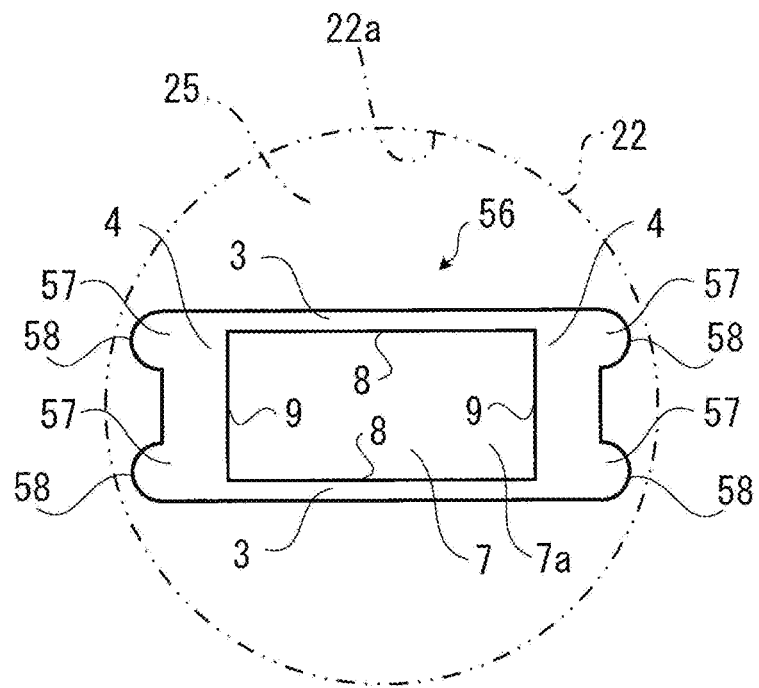
FIG. 5A is an explanatory diagram illustrating another modified example of the stirring bar of the first embodiment and FIG. 5B is an explanatory diagram illustrating another modified example.

Further, as in a stirring bar 56 of a fourth modified example illustrated in FIG. 5A, a plurality of (here, four) convex portions 57 facing outward can be provided. The convex portion 57 is formed at both ends of the outer surface 6 of the short side portion 4 so as to protrude in a semi-circular shape. Furthermore, the protrusion direction of the convex portion 57 matches the longitudinal direction of the long side portion 3 and the convex portion 57 has a curved surface 58 facing outward. Since such a convex portion 57 is provided, the outer shape of the stirring bar 56 can be enlarged and the outermost surface (here, the curved surface 58) of the stirring bar 56 can approach an inner wall surface 22a of the reagent bottle 21. Then, in the stop state of the stirring bar 56, the matching between the center J of the stirring bar 56 and the center K of the reagent bottle 21 is easy and the centering of the stirring bar 56 is easy. Further, since the convex portion 57 is provided, the motion (flow) of the reagent around the convex portion 57 is easily generated during the rotation of the stirring bar 56 and the stirring efficiency can be improved.

Figure 5B:
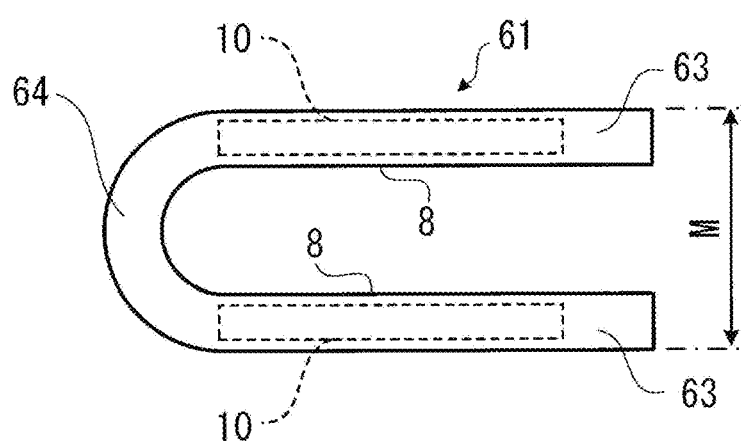

Further, as in a fifth modified example illustrated in FIG. 5B, a stirring bar 61 can have a U-shape and the long side portions 63 can be connected to each other by a curved portion 64. In this way, when introducing the stirring bar into the reagent bottle 21, two long side portions 63 can be compressed while being sandwiched between fingers and can be allowed to enter the mouth portion 24 while narrowing the width M on the whole. Additionally, in the fourth modified example, the magnet 10 is incorporated in the long side portion 63 and the magnet 10 does not exist in the curved portion 64.

Further, although not illustrated in the drawings, a folding structure can be adopted for the stirring bar. For example, the stirring bar is folded and miniaturized when introducing the stirring bar into the reagent bottle 21 and its shape is restored and expanded after introducing the stirring bar into the reagent bottle. Further, when there is no influence on the reagent, it is possible to adopt a structure or material that swells and expands when immersed in the reagent. Further, a groove may be provided in the upper surface 12 and the lower surface (reference numerals omitted) of various stirring bars 1, 41, 46, and 56 having the through-holes 7 so that the reagent flows into the through-holes 7 from outside the stirring bars 1, 41, 46, and 56. As the shape of the groove in this case, for example, a radial shape (including a radial shape of a straight line or a curved line) with the center J of the through-hole 7 at the center can be exemplified.

Figure 6A:
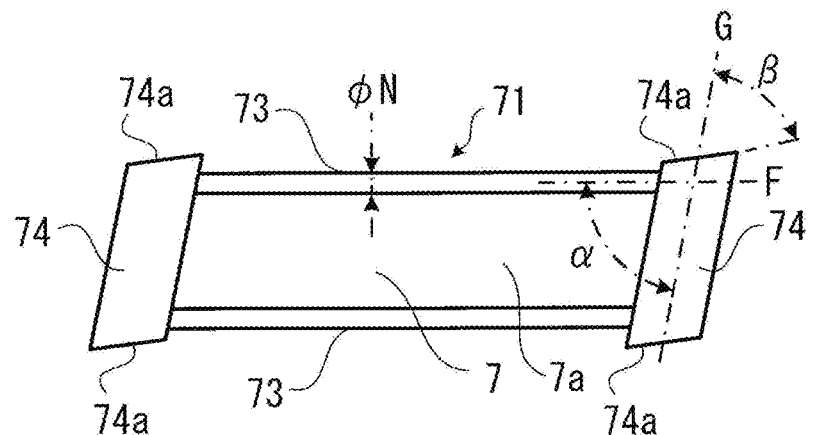
FIG. 6A is an explanatory diagram illustrating a stirring bar of a second embodiment and FIG. 6B is an explanatory diagram illustrating a modified example of the stirring bar of the second embodiment.

Next, a second embodiment of the invention will be described. FIG. 6A is a diagram schematically illustrating a state in which a stirring bar 71 according to the second embodiment of the invention has a horizontal posture when viewed from above. In the stirring bar 71, the long side portion 3 of the stirring bar 1 of the first embodiment has a thin wire shape instead of a prismatic shape. The long side portion 73 having a thin wire shape has a columnar cross-section and its diameter N is, for example, about 2 mm or less.

Here, as the material of the long side portion 73, various materials such as synthetic resin and stainless steel can be used as long as they have sufficient rigidity. Further, even when the material of the long side portion 73 is magnetic, it is possible to prevent the rotation of the stirring bar 71 from being influenced by the magnetism of the long side portion 73 by making the magnetism of the long side portion 73 sufficiently weaker than the magnet (not illustrated) incorporated in the short side portion 74.

Further, the second embodiment illustrated in FIG. 6A is modified such that the short side portion 4 of the first embodiment protrudes in the horizontal direction when the stirring bar is introduced into the reagent bottle 21. That is, in the stirring bar 71, the shape of the short side portion 74 becomes a parallelogram when the horizontal posture is viewed from above as illustrated in FIG. 6A. Then, the short side portion 74 is inclined by an angle α with respect to an axis F of the long side portion 73. Further, an axial end surface 74a of the short side portion 74 is inclined by a predetermined angle β with respect to a center axis G of the short side portion 74. In the embodiment, a relationship between the angle α and the angle β becomes α>β.

According to such a stirring bar 71 of the second embodiment, since the long side portion 73 is formed of a thin wire, the influence of the long side portion 73 on the movement (flow) of the reagent can be suppressed. Then, reagent bubbling can be prevented and the accuracy of liquid surface detection can be suppressed from being influenced by bubbles. Further, even when the liquid surface is detected during the stirring, the accuracy of the liquid surface detection can be suppressed from being influenced by the liquid surface fluctuation. Here, as the cross-sectional shape of the long side portion 73 formed of a thin wire, various shapes such as an ellipse, a triangle, and a rhombus can be adopted in addition to a circle. Then, it is conceivable that the acute angle portion of the cross-section faces the outside in the horizontal direction in the reagent bottle 21 to reduce the resistance to the reagent during rotation.

Further, according to the stirring bar 71 of the second embodiment, since the diameter N of the long side portion 73 is 2 mm, the area occupied by the long side portion 73 decreases and hence the long side portion 73 hardly interferes with the nozzle 32. Furthermore, since each portion of the short side portion 74 is provided so as to be inclined with respect to the long side portion 73 at angles α and β, an acute angle portion can be formed in the short side portion 74. Accordingly, the resistance of the reagent flowing during rotation can be reduced and bubbling and liquid surface fluctuation can be prevented.

Figure 6B:
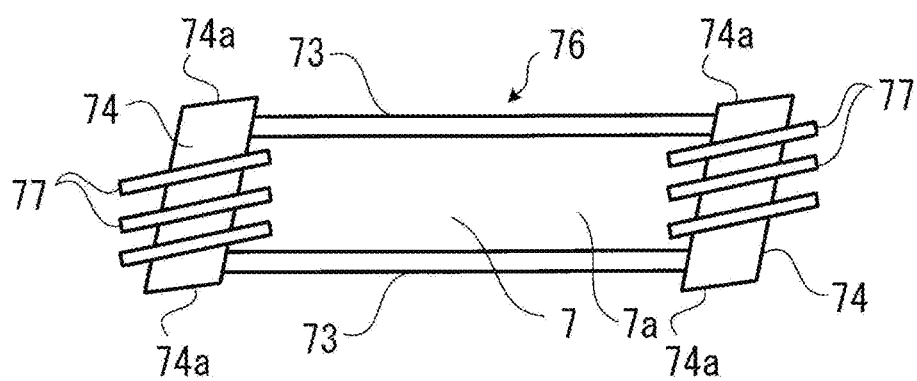

Further, fins 77 may be provided in the short side portion 74 as in the stirring bar 76 illustrated in FIG. 6B so as to adjust the influence of the flow of the reagent. The adjustment of the flow using the fins 77 can be optimized by changing the shape, the number, the angle, the surface roughness, and the like of the fins 77. Additionally, the fins 77 can be also applied to various stirring bars 1, 41, 46, 51, 56, 61, and the like exemplified as the first embodiment.

The invention claimed is:

1. A stirring bar configured to pass through an opening mouth portion of a container in which inner diameter of the opening mouth portion is smaller than that of a body portion of the container, and configured to rotate by a magnetic force transmitted from the outside of the container so as to stir a liquid contained in the container, the stirring bar comprising:
   A main body having a magnetic member incorporated therein, wherein
   the main body includes
      (1) an opening area in which a recess portion is formed, and the recess portion includes a depth which allows a nozzle going down therein when the nozzle lowered into the container,
      (2) long side portions a length of which is longer than a diameter of the opening mouth portion, and
      (3) short side portions a length of which is shorter than a diameter of the opening mouth portions and extending in a direction crossing to the long side portions, and
   the recess portion includes
      (4) inner long side portions which are longer than the diameter of the opening mouth portion, and
      (5) inner short side portions which are shorter than the diameter of the opening mouth portion, and
   wherein when the stirring bar is in a rotation state, the stirring bar receives the nozzle to go down in a circular center area of the recess portion a diameter of which is a length of the inner short side portion, and which is narrower area than the recess portion.

2. The stirring bar according to claim 1, wherein the recess portion penetrates the main body.

3. The stirring bar according to claim 2, wherein a shape of the recess portion is rectangular.

4. The stirring bar according to claim 3, wherein a shape of the main body is a rectangular.

5. The stirring bar according to claim 2, wherein a shape of the main body is a rectangular.

6. The stirring bar according to claim 1, wherein a shape of the recess portion is rectangular.

7. The stirring bar according to claim 6, wherein a shape of the main body is a rectangular.

8. The stirring bar according to claim 1, wherein a shape of the main body is a rectangular.

9. A stirring method of introducing a stirring bar having a magnetic member therein into a container in which diameter of an opening mouth portion is smaller than that of a body portion of the container, and rotating the stirring bar by a magnetic force transmitted from the outside of the container so as to stir a contained liquid in the container,
   wherein the stirring bar comprises a main body having the magnetic member incorporated therein, including:
      (1) an opening area in which a recess portion is formed, and the recess portion includes a depth which allows a nozzle going down therein when the nozzle lowered into the container, (2) long side portions a length of which is longer than a diameter of the opening mouth portion, and (3) short side portions a length of which is shorter than a diameter of the opening mouth portions and extending in a direction crossing to the long side portions, and the recess portion includes (4) inner long side portions which are longer than the diameter of the opening mouth portion, and (5) inner short side portions which are shorter than the diameter of the opening mouth portion, and wherein when the stirring bar is in a rotation state, the stirring bar receives the nozzle to go down in a circular center area of the recess portion a diameter of which is a length of the inner short side portion, and which is narrower area than the recess portion.

10. The stirring method according to claim 9, wherein the recess portion penetrates the main body.

\* \* \* \* \*